(12) United States Patent  
Mussack et al.

(10) Patent No.: US 7,483,939 B2  
(45) Date of Patent: Jan. 27, 2009

(54) MEDICAL PROCESSING SYSTEM ALLOCATING RESOURCES FOR PROCESSING 3D TO FORM 2D IMAGE DATA BASED ON REPORT OF MONITOR DATA

(75) Inventors: Christopher Joseph Mussack, Waukesha, WI (US); Litao Yan, Waukesha, WI (US); Cheryl Ruth Jones, Hubertus, WI (US); Saad Ahmed Sirohey, Pewaukee, WI (US); David Charles Mack, Waukesha, WI (US)

(73) Assignee: General Electric Company, Schenenctady, NY (US)

( * ) Notice: Subject to any disclaimer, the term of this patent is extended or adjusted under 35 U.S.C. 154(b) by 699 days.

(21) Appl. No.: 11/211,318

(22) Filed: Aug. 25, 2005

(65) Prior Publication Data

US 2007/0046966 A1  Mar. 1, 2007

(51) Int. Cl.  
*G06F 15/16* (2006.01)

(52) U.S. Cl. .................. 709/201; 709/203; 709/218

(58) Field of Classification Search ............. 709/201, 709/203, 217, 218, 219, 246; 345/506; 715/733; 705/1; 702/22; 382/128  
See application file for complete search history.

(56) References Cited

U.S. PATENT DOCUMENTS

| 6,281,903 | B1 | 8/2001 | Martin et al. |
| 6,377,257 | B1 | 4/2002 | Borrel et al. |
| 6,384,821 | B1 | 5/2002 | Borrel et al. |
| 6,525,732 | B1 | 2/2003 | Gadh et al. |
| 6,570,590 | B1 | 5/2003 | Dubrow et al. |
| 6,608,628 | B1 | 8/2003 | Ross et al. |
| 6,621,918 | B1 | 9/2003 | Hu et al. |
| 6,683,933 | B2 | 1/2004 | Saito et al. |
| 6,704,024 | B2 | 3/2004 | Robotham et al. |
| 6,798,417 | B1 | 9/2004 | Taylor |
| 6,856,414 | B1 | 2/2005 | Haneda et al. |
| 7,061,495 | B1 * | 6/2006 | Leather ................... 345/506 |
| 7,266,616 | B1 * | 9/2007 | Munshi et al. ............ 709/246 |
| 2002/0057850 | A1 | 5/2002 | Sirohey et al. |
| 2003/0158886 | A1 * | 8/2003 | Walls et al. .............. 709/201 |
| 2003/0174872 | A1 * | 9/2003 | Chalana et al. .......... 382/128 |
| 2004/0088117 | A1 * | 5/2004 | Dorsett, Jr. ............... 702/22 |
| 2004/0249654 | A1 * | 12/2004 | Sohl et al. .................. 705/1 |
| 2005/0184995 | A1 * | 8/2005 | Lefebvre et al. ......... 345/506 |
| 2006/0015814 | A1 * | 1/2006 | Rappaport et al. ....... 715/733 |

* cited by examiner

*Primary Examiner*—Le Luu  
(74) *Attorney, Agent, or Firm*—McAndrews, Held & Malloy, Ltd.; Peter J. Vogel; Michael J. Dellapenna

(57) ABSTRACT

Certain embodiments of the present invention provide a method of medical image processing on a distributed network including: communicating on a distributed network comprising a server, a client, and a communications pathway having a bandwidth, wherein the distributed network comprises system resources related to the server, the client, and the communications pathway; monitoring the system resources and the bandwidth with at least one process monitor to generate monitor data; and recommending an allocation of at least a portion of the system resources for processing three dimensional image data to form two dimensional image data displayable on the client, wherein the allocation is based at least in part on the monitor data.

19 Claims, 8 Drawing Sheets

|  | Server Loading | Client Processing Speed | Bandwidth | Recommendation |
|---|---|---|---|---|
| Example 1 | unloaded | slow | high | Processing to should be performed mostly on server |
| Example 2 | unloaded | slow | low | Simple tasks like pan & zoom should be performed on client, advanced tasks should be on server |
| Example 3 | loaded | fast | high | Processing should mostly be performed on client |

| | Server Loading | Client Processing Speed | Bandwidth | Recommendation |
|---|---|---|---|---|
| Example 1 | unloaded | slow | high | Processing to should be performed mostly on server |
| Example 2 | unloaded | slow | low | Simple tasks like pan & zoom should be performed on client, advanced tasks should be on server |
| Example 3 | loaded | fast | high | Processing should mostly be performed on client |

500

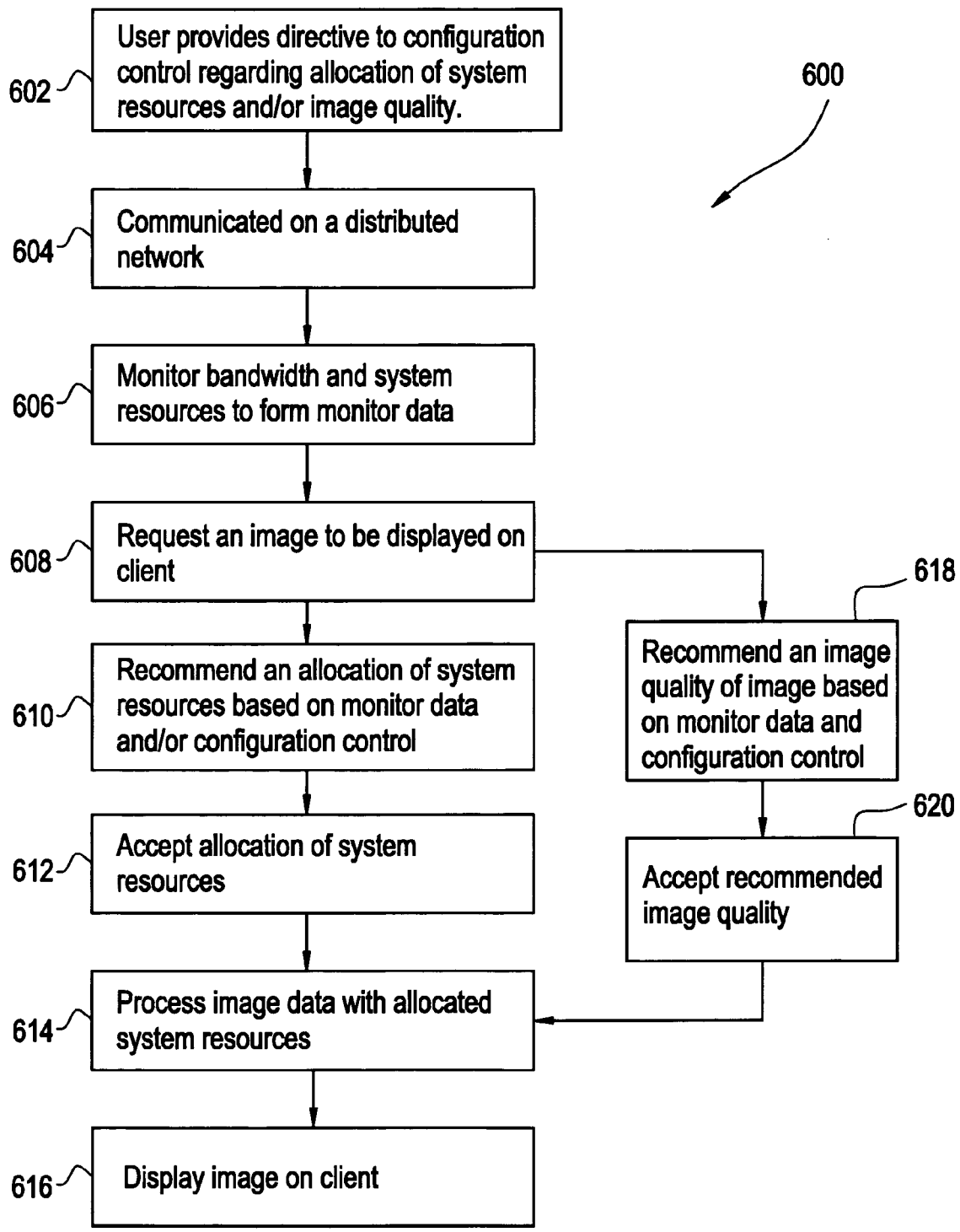

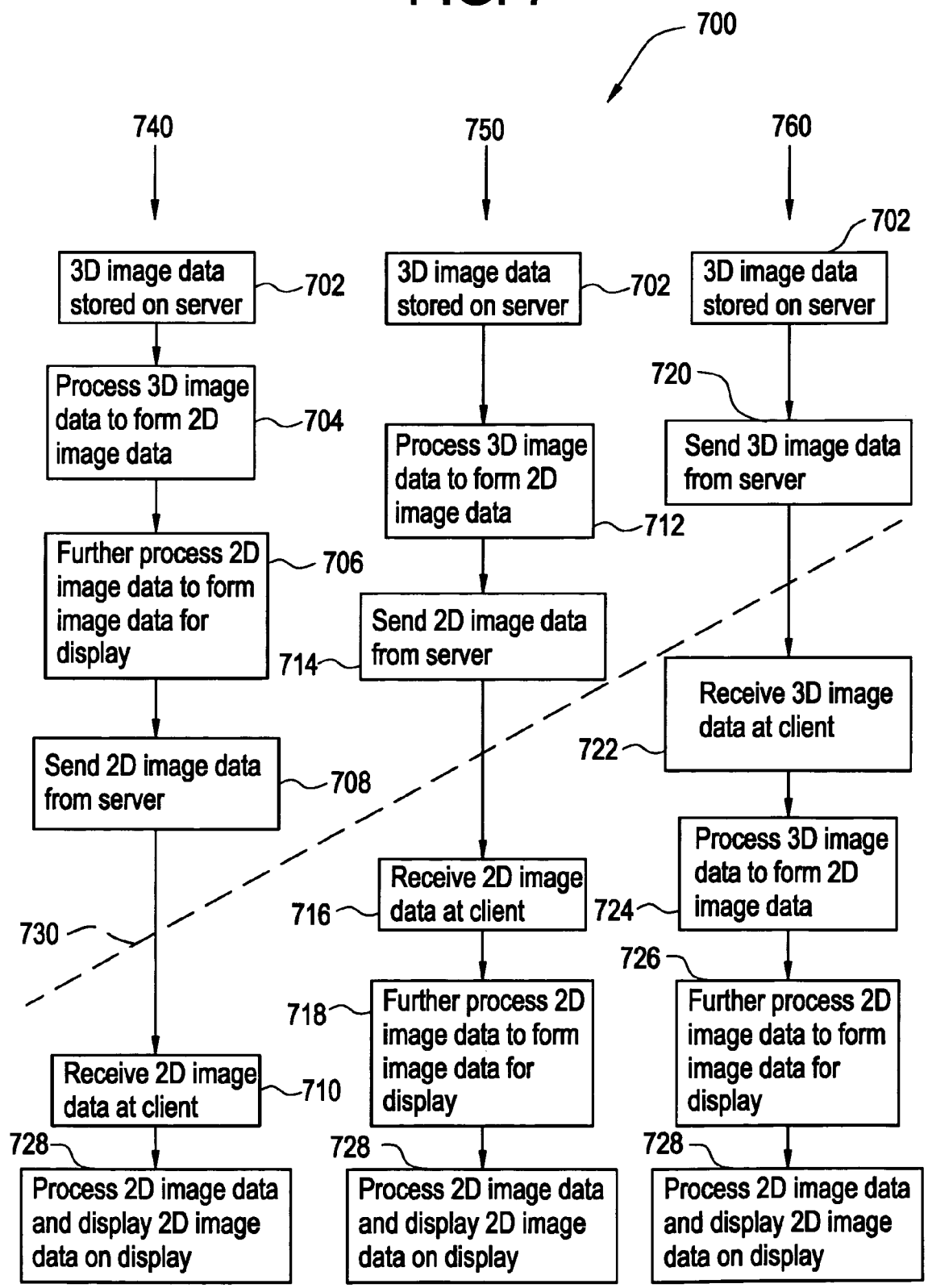

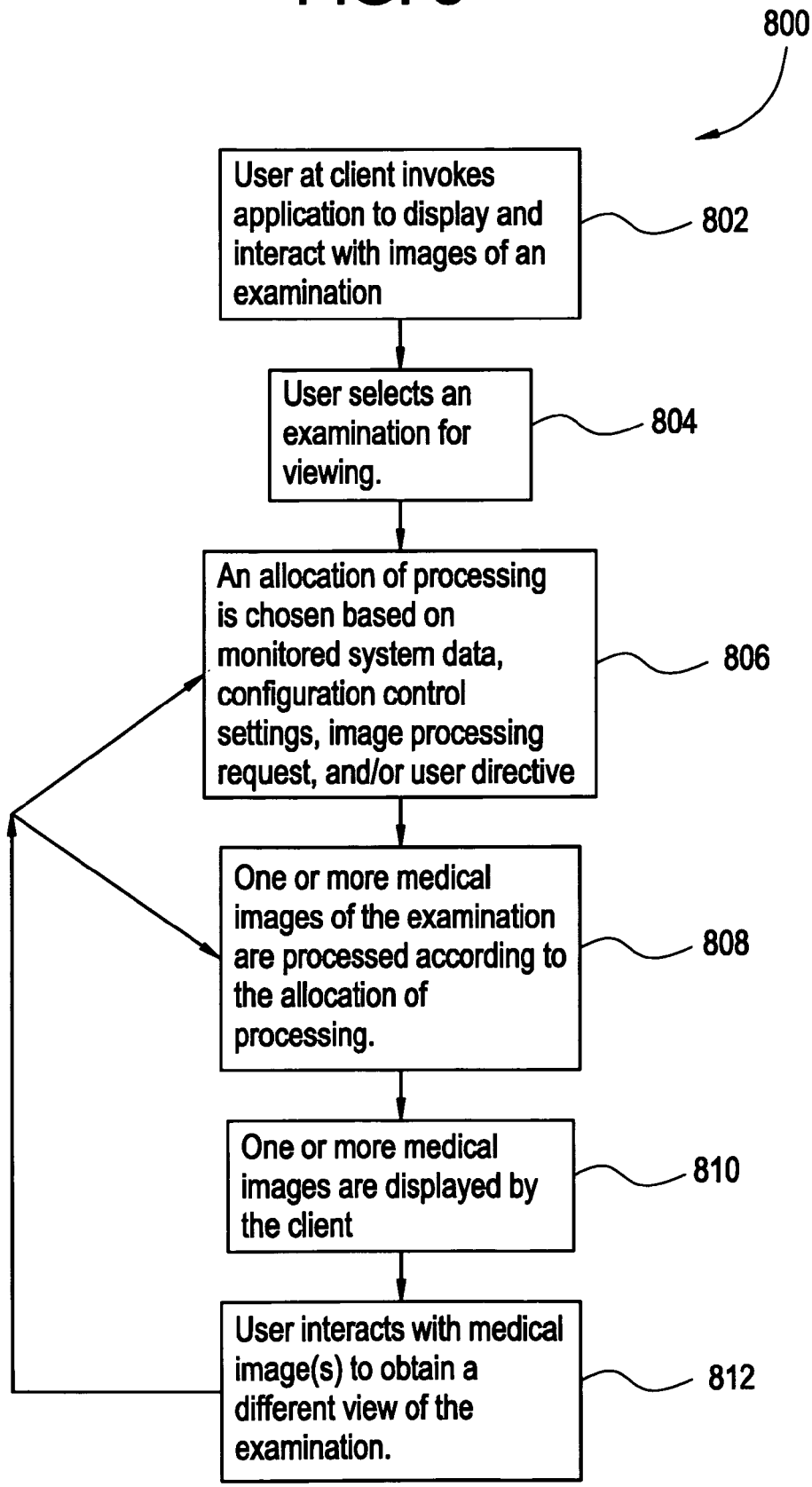

MEDICAL PROCESSING SYSTEM ALLOCATING RESOURCES FOR PROCESSING 3D TO FORM 2D IMAGE DATA BASED ON REPORT OF MONITOR DATA

DISTRIBUTED IMAGE PROCESSING FOR MEDICAL IMAGES

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Embodiments of the present application relate generally to distributed processing. Particularly, certain embodiments relate to allocating medical image data processing between a client and a server to display an image on the client.

The proliferation of computers in the modern era has been accompanied by a proliferation of computer networks. Computer networks include local area networks (LANs), wide area networks (WANs), wired networks, wireless networks, optical networks, and the like, or any combination thereof. Networks allow for communications between individual computers on the network.

In addition to sharing data, computer networks also facilitate the sharing of computer resources. In a resource-sharing network, the overall amount of resources available to an individual computer is enhanced. A resource-sharing network may also be called a distributed network, because the overall resources available on the network are distributed throughout the network.

The term distributed network is a broad term, and encompasses a wide variety of network models. For example, a distributed network may be a server-centric network, or a client-centric network. Server-centric networks may be designed so that certain critical resources are provided by a server. This may be advantageous when, for example, it is desirable to have relatively inexpensive clients or clients without much processing power. Client-centric networks, by contrast may rely more heavily on the client for the provision of certain critical resources.

One of the factors that may influence the design of a network is bandwidth. In distributed networks with relatively low bandwidth, it may be desirable to choose a design that reduces network traffic. For example, in a low bandwidth network, it may be desirable to provide a server-centric network. By contrast, in a distributed network with relatively high bandwidth may allow for increased architectural flexibility.

Distributed networks are known for synthetic model imaging. For example, U.S. Pat. No. 6,377,257, entitled "METHODS AND APPARATUS FOR DELIVERING 3D GRAPHICS IN A NETWORKED ENVIRONMENT," (hereinafter "Borrel"), discusses a way of rendering synthetic models on both a client and a server. Borrel indicates that prior art schemes are known to operate by decomposing a synthetic model into its constituent parts (e.g. foreground objects and background), with a server rendering some of the parts and a client rendering the rest of the parts.

Additionally, synthetic modeling systems are known to adapt distributed imaging techniques based on feedback from the client. Borrel discusses a scheme for providing feedback from a client. Such feedback consists of error correction, user-defined feedback, and quality. The server must process the feedback, and then attempt to make adjustments in the distributive process to arrive at an efficient solution.

Solutions that are applicable for synthetic modeling, however, may prove less practical for medical imaging. Unlike modeling, medical images tend to be organic, or unitary. In other words, medical images may not readily be decomposed into constituent parts. For example, a synthetic model of a human spine may be generated and stored based on a variety of constituent parts including each vertebrae, each disk, surface texturing of each vertebrae, surface texturing of each disk, etc. By contrast, a medical image of a human spine (captured by an x-ray, for example) may include no such constituent components. Instead, a medical image of a human spine may be a unitary image that does not readily decompose into constituent components. Thus, decomposition solutions may not be practical for distributed imaging of medical images.

Additionally, adaptive techniques that rely on feedback may fail to efficiently allocate distributed resources at the outset of a processing task. In other words, feedback-reliant systems may eventually gravitate towards an efficient solution, but may inefficiently allocate resources at the beginning of a task. Moreover, feedback may be a crude measure for determining efficient allocation of resources. For example, a known type of feedback involves the use of time-stamping to measure how quickly a client performs a task, or a portion thereof. Such feedback information may vary based on a wide variety of factors, including network bandwidth, the client's central processing unit ("CPU") speed and load, the client's available random access memory, the client's available video memory, the server's CPU speed and load, and the like. Thus, it may not be possible to efficiently determine which particular factor may be influencing feedback information.

In order to display a medical image, process medical image data that was acquired through use of a medical imaging system may be processed. Medical imaging systems, such as computed tomography (CT) scan systems may obtain image data in slices. A slice may be a two-dimensional (2D) slice. Although a slice may have a relatively small thickness in a third dimension, it may be conceptually convenient to refer to a slice as 2D. Multiple 2D slices may be obtained that correspond to varied cross-sections of a 3D volume of interest 2D image data slices may be processed into a 3D image data volume. One or more relatively large data files may store and/or process a 3D medical image data volume.

A clinician may not be able to view a 3D medical image data volume without further processing. A display, such as a flat-panel liquid crystal diode display or a cathode ray tube display, may only be able to display 2D images. Note, that 2D images may appear 3D to the viewer. Thus, to display a medical image on a display, 3D data may be processed to form 2D data.

A variety of techniques are known for processing 3D image data into 2D image data. These techniques include multiplanar reformatting (MPR), maximum (or minimum) intensity projection (MIP), and volume rendering (VR). In MPR processing, a 3D volume may be processed to obtain a 2D slice that may be different than the slices obtained by a medical imaging system. For example, an application incorporating MPR functionality may allow a user to rotate a displayed image at any angle and centered at any location within the volume. Thus, MPR allows a clinician to view the anatomy from any of a variety of positions and angles.

In MIP processing, a 3D volume may be processed to obtain a 2D slice that a viewer may perceive as being 3D. MIP processing may create a 2D image that is a combination of a stack of 2D slices. There are several ways to combine the pixels in each 2D slice to form a 2D image. For example, each pixel in a final 2D image may be the brightest or darkest pixel out of corresponding pixels in the stack of 2D slices. In another example, each pixel in the final 2D image may be an average of corresponding pixels in the stack of 2D slices.

VR processing is another way to display a 3D volume in 2D. VR processing renders the surface and/or interior of an object, making the surface of the object appear solid, transparent and/or translucent. Objects inside the interior of a volume of interest (such as organs, blood vessels, bones, etc.) may also be made to appear solid, transparent, and/or translucent.

Techniques for converting 3D data into a 2D displayable image, such as MPR, MIP, and VR, may be useful to clinicians. In addition, such techniques may also significantly reduce the size of data. A 2D displayable image may be a fraction of the size of a 3D data volume. However, techniques such as MPR, MIP, and VR may consume a substantial amount of processing resources. If processing resources are not readily available, imaging performance may become slow or degraded. Similarly, if a network has relatively low bandwidth, it may take a relatively long time to transfer 3D image data across the network. Moreover, other factors such as image quality of both 3D data and processed 2D data may impact the performance of an image display system.

Thus, there is a need for methods and systems that efficiently process medical image data on a distributed network. Additionally, there is a need for methods and systems that efficiently allocate medical image processing tasks throughout a distributed network. There is a need for methods and systems that provide flexibility and control to a user of a distributed medical imaging system.

BRIEF SUMMARY OF THE INVENTION

Certain embodiments of the present invention provide a method of medical image processing on a distributed network including: communicating on a distributed network comprising a server, a client, and a communications pathway having a bandwidth, wherein the distributed network comprises system resources related to the server, the client, and the communications pathway; monitoring the system resources and the bandwidth with at least one process monitor to generate monitor data; and recommending an allocation of at least a portion of the system resources for processing three dimensional image data to form two dimensional image data displayable on the client, wherein the allocation is based at least in part on the monitor data. In an embodiment, the processing three dimensional image data to form two dimensional image data comprises at least one of: multi-planar reformatting; minimum intensity projection, maximum intensity projection, and volume rendering. In an embodiment, the processing three dimensional image data to form two dimensional image data comprises at least one of: rotate, zoom, pan, contrast adjustment, brightness adjustment, and grayscale adjustment. In an embodiment, the image corresponds to medical image data. In an embodiment, the at least one process monitor comprises a client-side monitor and a server-side monitor. In an embodiment, the allocation is automatically accepted by at least one of: the server and the client. In an embodiment, the system resources comprises a processing load of the server, and a processing speed of the client. In an embodiment, the system resources further comprises a processing performance of the client. In an embodiment, the method further comprises recommending an image quality of the image based at least in part on the monitor data.

Certain embodiments of the present invention provide a system for medical image processing comprising: a server comprising server processing resources and capable of storing three dimensional image data; a client capable of communications with the server through a communication pathway having a bandwidth, the client comprising client processing resources, and the client capable of displaying a two dimensional image formed from the three dimensional image data; and a configuration control capable of allocating at least a portion of the server processing resources and at least a portion of the client processing resources for displaying the image on the client based at least in part on the client processing resources, the server processing resources, and the bandwidth. In an embodiment, the configuration control is capable of interacting with a recommendation provider for providing recommendations for an apportionment of image processing amongst the client and the server based at least in part on the client processing resources, the server processing resources, and the bandwidth. In an embodiment, the two dimensional image is formable from the three dimensional image data with at least one of: multi-planar reformatting; minimum intensity projection, maximum intensity projection, and volume rendering. In an embodiment, the configuration control is adjustable by a user. In an embodiment, the configuration control is further capable of controlling an image quality of the image. In an embodiment, the configuration control is capable of receiving information corresponding to the bandwidth, the server processing resources, and the client processing resources. In an embodiment, the configuration control is capable overriding the recommendations of the recommendation provider. In an embodiment, the configuration control is capable of causing an overriding of a prior designation of the image quality.

Certain embodiments of the present invention provide a system for apportioning image processing between a client and a server comprising: a server comprising server processing resources and capable of storing three dimensional medical image data; a client comprising client processing resources, wherein the client is capable of displaying a two dimensional image; a communication channel between the client and the server, wherein the communication channel comprises a bandwidth; at least one process monitor for monitoring the bandwidth, the client processing resources, and the server resources to generate monitor data; and a recommendation provider for providing recommendations comprising an apportionment of processing amongst the client and the server based at least in part on the monitor data to process the three dimensional image data to form the two dimensional image. In an embodiment, the three dimensional image data is processable to form the two dimensional image with at least one of: multi-planar reformatting; minimum intensity projection, maximum intensity projection, and volume rendering. In an embodiment, the monitor further monitors a processing performance of the client to form the monitor data. In an embodiment, the at least one process monitor comprises a server-side process monitor and a client-side process monitor. In an embodiment, at least a portion of the recommendations are automatically accepted by at least one of: the server and the client. In an embodiment, the recommendations further comprise an image quality of the image.

Certain embodiments of the present invention provide a computer-readable storage medium including a set of instructions for a computer, the set of instructions comprising: a monitoring routine for monitoring system resources of a distributed network comprising a client and a server, and a bandwidth of a communications channel linking the client and the server, wherein the monitoring routine generates monitor data; a requesting routine for requesting display of a two dimensional image at the client, the two dimensional image formable by processing three dimensional image data storable on the server; and a recommending routine for recommending an image quality of the two dimensional image, and an allocation of the system resources on the distributed network to display the two dimensional image at the client based at least on the monitor data. In an embodiment, the system resources comprises a processing load of the server and a processing speed of the client. In an embodiment, the allocation of the system resources comprises at least one of: an allocation of the system resources corresponding to the server for 3D image processing and 2D image processing; an allocation of the system resources corresponding to the client for 3D image processing and 2D image processing; and an allocation of the system. In an embodiment, resources corresponding to the server for 3D image processing and the system resources corresponding to the client for 2D image processing. In an embodiment, the recommendation routine recommends an allocation of allocation of the system resources corresponding to the server for 3D image processing and 2D image processing based at least in part on the monitor data indicating the server is substantially unloaded. In an embodiment, the recommendation routine recommends an allocation of the system resources corresponding to the client for 3D image processing and 2D image processing based at least in part on the monitor data indicating the server is substantially loaded and the bandwidth of the communications channel is capable of communicating the three dimensional image data from the server to the client without substantial delay. In an embodiment, the recommendation routine recommends an allocation of the system resources corresponding to the server for 3D image processing and the system resources corresponding to the client for 2D image processing based at least in part on the monitor data indicating the server is substantially loaded and the bandwidth of the communications channel is capable of communicating the three dimensional image data from the server to the client with substantial delay.

BRIEF DESCRIPTION OF SEVERAL VIEWS OF THE DRAWINGS

FIG. 5 shows a table with several examples of allocation in accordance with an embodiment of the present application.

FIG. 6 shows a flowchart for a method of providing configuration control interaction for allocating system resources in a distributed image processing system in accordance with an embodiment of the present application FIG. 7 shows a flowchart of a method for distributed imaging display in accordance with an embodiment of the present invention.

FIG. 8 shows a flowchart of a method 800 illustrating iterative user interaction with an examination displayed on a client according to an embodiment of the present invention.

Figure 1:
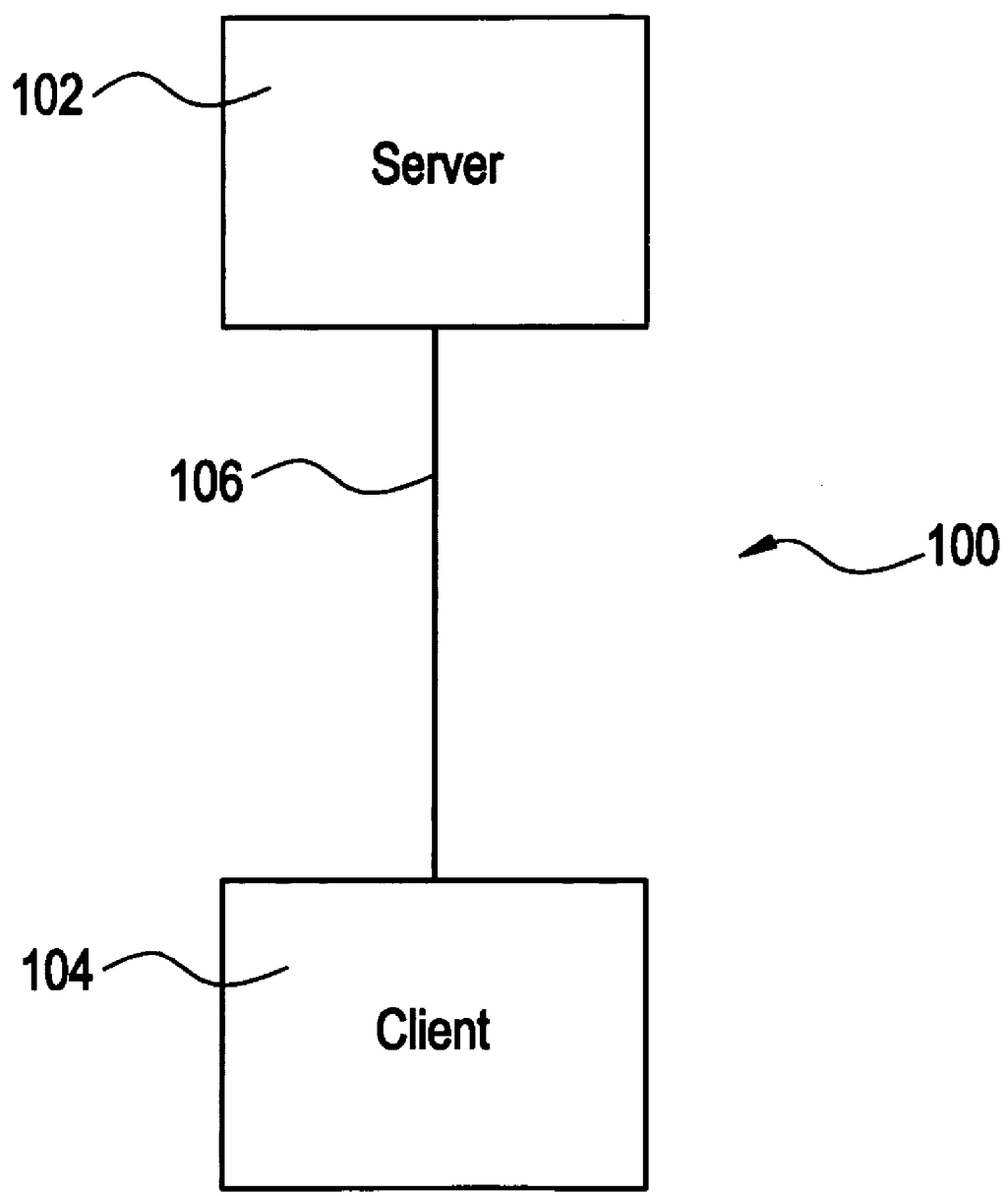
FIG. 1 shows a distributed network according to an embodiment of the present application.

The foregoing summary, as well as the following detailed description of certain embodiments of the present application, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

FIG. 1 shows a block diagram of a distributed network 100 according to an embodiment of the present application. Distributed network 100 may include a server 102, a client 104, and a communication pathway 106. The communication pathway 106 has an associated bandwidth. The bandwidth of communication pathway 106 may be uniform across the entire communication pathway 106, or it may vary along various segments. For example, a communication pathway 106 may include a combination of various types of networks having various bandwidths, such as a copper wire twisted-pair network and an optical network. A communication pathway 106 may include a local area network (LAN), wide area network (WAN), wired network, wireless network, optical network, and the like, or any combination thereof. Similarly, a communication pathway 106 may include various network elements, such as routers, repeaters, switches, hubs, splitters, couplers, intermediary computers, or the like.

Figure 2:
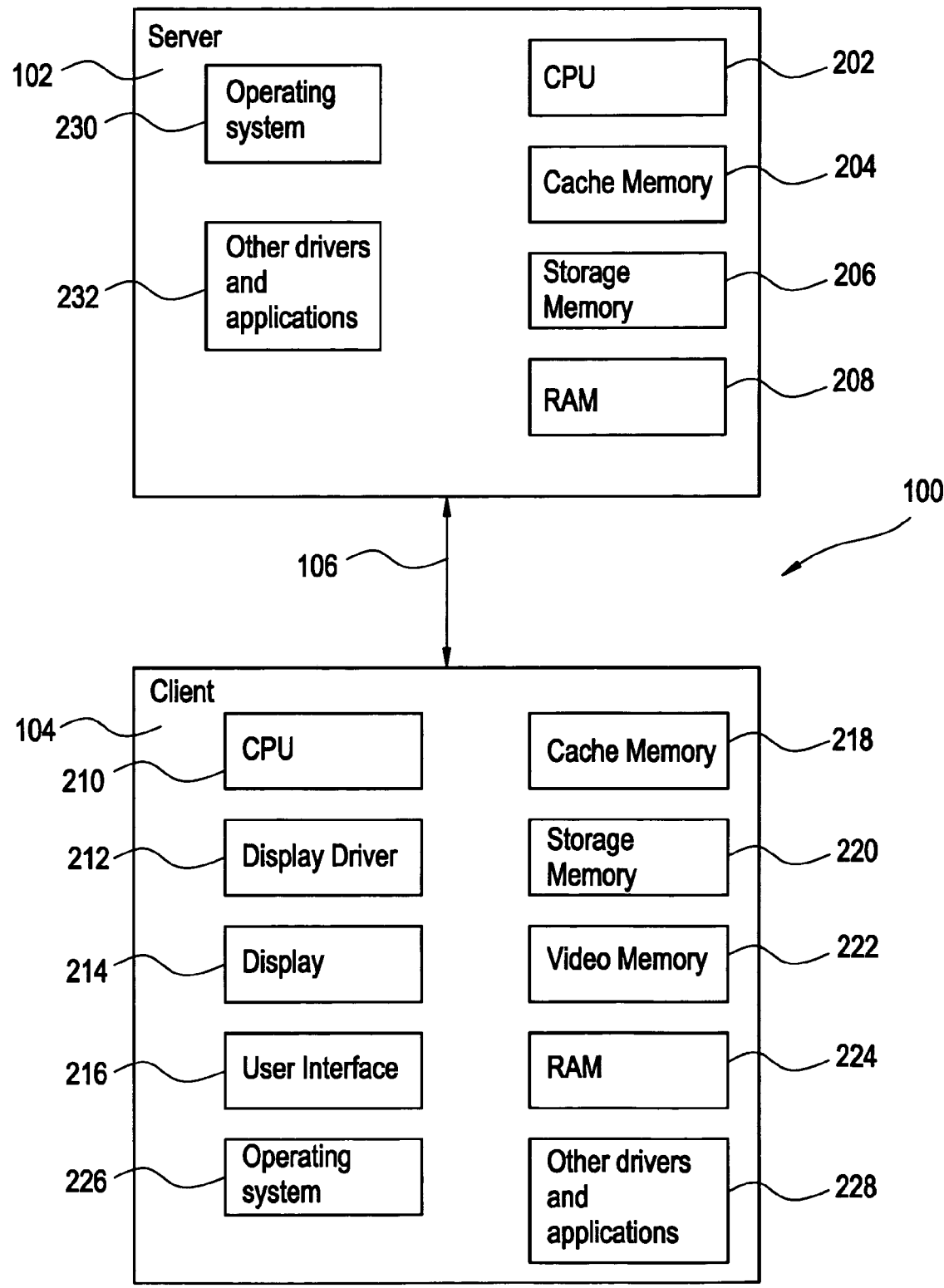
FIG. 2 shows a block diagram of a distributed imaging system according to an embodiment of the present application.

FIG. 2 shows a block diagram of a distributed imaging system 100 according to an embodiment of the present application. Server 102 may include CPU 202, cache memory 204, storage memory 206, RAM 208, operating system 230, and other drivers and applications 232. CPU 202 may include multiple processors. Cache memory 204 may include volatile memory that may be rapidly accessed by CPU 202. Storage memory 206 may include digital, non-volatile storage, such as a magnetic hard drive, optical hard drive, flash memory, EEPROM, or the like. RAM 208 may include dynamic RAM, static RAM, battery-backed RAM, or the like. Operating system 230 may include, for example, a Windows®, Unix®, Linux, or Macintosh® operating system. Operating system 230 may be designed for operation on a server 102. Operating system 230 may facilitate interaction between various of server 102 components. Other drivers and applications 232 may include a variety of hardware and software modules. For example, other drivers and applications 232 may include a graphics accelerator hardware module and a three-dimensional graphics processor software module. Other drivers and applications 232 may include drivers and applications intended to facilitate medical image processing. As used in this application, image processing is a broad term, including, for example, image display and volume rendering. Image processing may include, for example, processing of 2D, 3D, and 2D-projection image data, and the like. Image processing may include, for example, MPR, MIP, VR, and the like. Image data may be formatted with a variety of formats, including, for example, DICOM, ANALYZE, BMP, JPG, GIF, TIF, and the like. Image data may be compressed or decompressed.

Client 104 may be a personal computer, desktop, laptop, workstation, dumb terminal, thin client, or the like. Client 104 may include CPU 210, display driver 212, display 214, user interface 216, cache memory 218, storage memory 220, video memory 222, RAM 224, operating system 226, and other drivers and applications 228. CPU 210 may include multiple processors. Display driver 212 may include specialized hardware for driving display 214. Display 214 may be a cathode ray tube, a flat-panel monitor, a liquid crystal display, an array of light emitting diodes, or the like. User interface 216 may include a mouse and keyboard, or other external input device to accept actions from a user. Cache memory 218 may include volatile memory that may be rapidly accessed by CPU 210. Storage memory 220 may include digital, non-volatile storage, such as a magnetic hard drive, optical hard drive, flash memory, EEPROM, or the like. Video memory 222 may include RAM, such as dynamic RAM. Video memory 222 may buffer image data before a corresponding image is displayed on display 214. RAM 224 may include dynamic RAM, static RAM, battery-backed RAM, or the like. Operating system 226 may include, for example, a Windows®, Unix®, Linux, or Macintosh® operating system. Operating system 226 may be designed for operation on a client 104. Operating system 226 may facilitate interaction between various of client 104 components. Other drivers and applications 228 may include a variety of hardware and software modules. For example, other drivers and applications 228 may include a graphics accelerator software module and a three-dimensional graphics processor hardware module. Other drivers and applications 228 may include drivers and applications intended to facilitate medical image data processing, such as MPR, MIP, VR, and the like.

Figure 3:
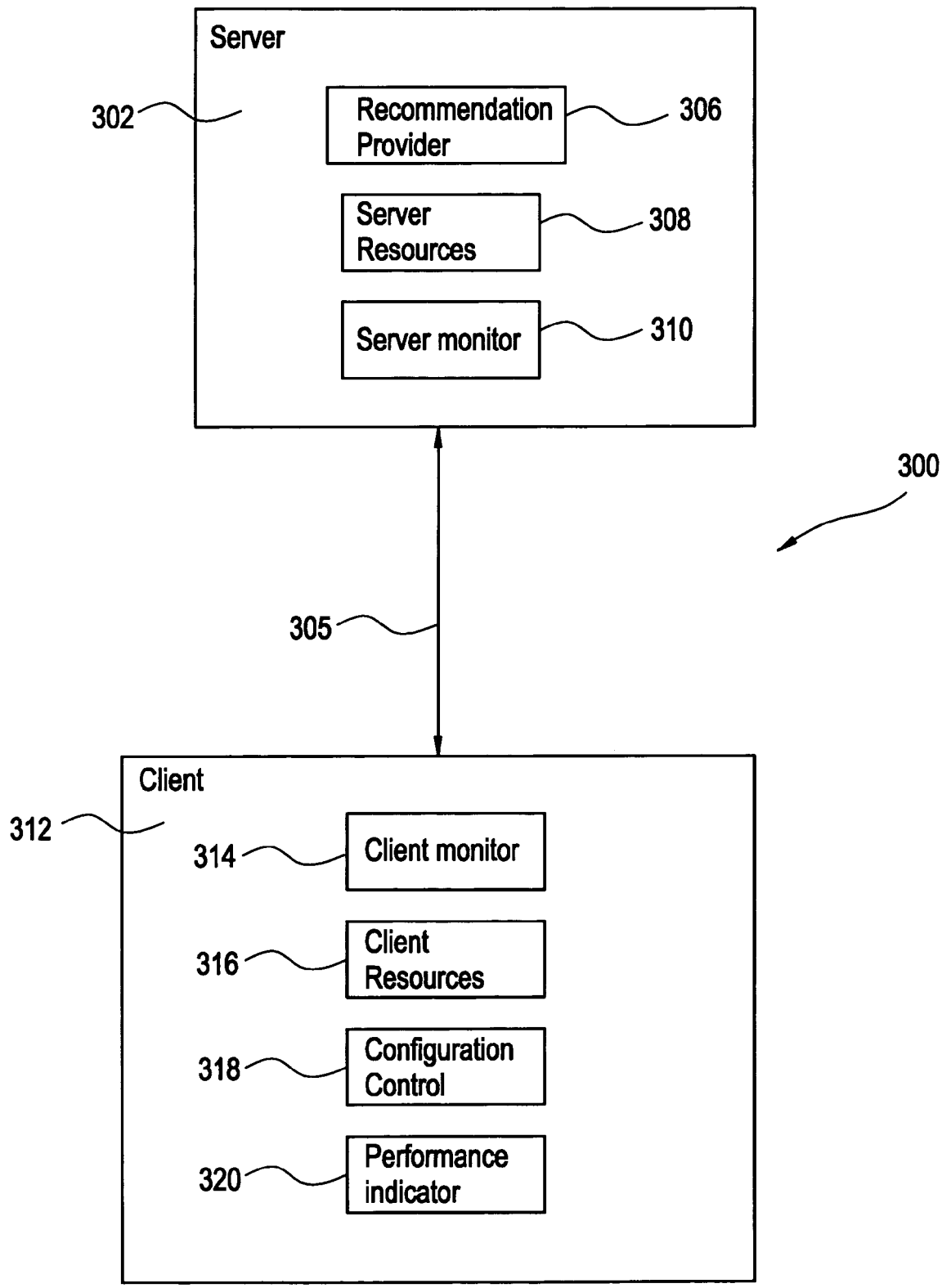
FIG. 3 shows a block diagram of a distributed imaging system according to an embodiment of the present application.

FIG. 3 shows a block diagram of a distributed imaging system 300 according to an embodiment of the present application. Server 302 may be similar to server 102 shown in FIGS. 1 and 2. Server 302 may include server resources 308, server monitor 310, and recommendation provider 306. Server resources 308 may include aspects of server components shown in FIG. 2. For example, server resources 308 may include aspects of CPU 202, cache memory 204, storage memory 206, RAM 208, operating system 230, and other drivers and applications 232. Server resources 308 may include type and version information of operating system 230, availability of CPU 202, available RAM 208, available cache 204, available storage memory 206, and type, version and availability of other drivers and applications 232. For example, server resources 308 may include the loading of CPU 202, and may also include information corresponding to a queue of backlogged requests.

Server monitor 310 may monitor system resources and a bandwidth of communication pathway 305. System resources may include server resources 308 and client resources 316. Server monitor 310 may provide monitor data corresponding to the system resources and bandwidth. Server monitor may, for example, monitor server resources 308 and bandwidth of communication pathway 305. Server monitor 310 may also communicate with client 312 to receive information gathered by client monitor 314, such as client resources 316, for example. Server monitor 310 may also communicate with client 312 to receive information from performance indicator 320. Server monitor 310 may be omitted, or may be provided as a device external to server 302. Server monitor 310 may be implemented with software, hardware, or firmware, or any combination thereof. It may also be possible to include server monitor 310 in client 312. Server monitor 310 may repetitively check information corresponding to some of server resources 308 and bandwidth. For example, server monitor 310 may periodically check the load on server CPU 202 (shown in FIG. 2), because server CPU 202 loading may change during operation of server 102. Server monitor 310 may also perform a one-time check on some of server resources 308 and bandwidth. For example, server monitor 310 may check a version of server operating system 230 (shown in FIG. 2) only during startup, since an operating system version is unlikely to change during continuous operation of server 302.

Recommendation provider 306 recommends an allocation of system resources between server 302 and client 312. Recommendation provider 306 may account for information gathered by server monitor 310, client monitor 314, configuration control 318, and performance indicator 320. Recommendation provider 306 need not be situated at server 302. Recommendation provider 306 may also be part of client 312, an additional device communicating on communication pathway 305, or distributed across server 302, client 312, or additional device. Recommendation provider 306 may be implemented with software, hardware, or firmware, or a combination thereof. Recommendation provider 306 will be discussed in greater detail below.

Client 312 may include client resources 316, client monitor 314, configuration control 318 and performance indicator 320. Client 312 may be similar to client 104 shown in FIG. 2. Client resources 316 may include aspects of client 104 components shown in FIG. 2. For example, server resources may include aspects of CPU 210, cache memory 218, storage memory 220, RAM 224, video memory 222, display driver 212, display 214, user interface 216, operating system 226, and other drivers and applications 228. Client resources 316 may include type and version information of operating system 226, availability of CPU 210, available RAM 224, available cache 210, available storage memory 220, available video memory 222, type of display 214, type of display driver 212, and type, version and availability of other drivers and applications 228. For example, client resources 316 may include hardware and software information corresponding to display driver 212 and CPU 210 operation speed.

Client monitor 314 may aggregate information corresponding to system resources and bandwidth of communication pathway 305. Client monitor 314 may, in particular, monitor client resources 316 and bandwidth. Client monitor may provide monitor data that corresponds to system resources and bandwidth. Client monitor 314 may also communicate with server 302 to receive information gathered by server monitor 310, such as server resources 308, for example. Client monitor 314 may receive information from performance indicator 320. Client monitor 314: may be omitted, or may be provided as a device external to client 312. It may also be possible to include client monitor 314 in server 302, as a separate device, or distributed across networked devices. Client monitor 314 may be implemented with software, hardware, or firmware, or any combination thereof. Client monitor 314 may repetitively check information corresponding to some of client resources 316 and bandwidth. For example, client monitor 314 may periodically check available client RAM 224, because available RAM 224 may change during operation of client 104. Client monitor 314 may also perform a one-time check on some of client resources 316 and bandwidth. For example, client monitor 314 may check information corresponding to display driver 212 only during startup, since a display driver 212 is unlikely to change during continuous operation of client 312.

Performance indicator 320 may estimate and/or aggregate one or more performance criteria of client 312. Performance indicator 320 may be part of client 312, server 302, additional device, or distributed across the network. Performance indicator 320 may be implemented with software, hardware, and/or firmware, or any combination thereof. As an example, performance indicator 320 may estimate processing performance of client 312 for displaying a medical image. Performance indicator 320 may provide information corresponding to the speed or quickness that client 312 displays a medical image on display 214 for a user to view. Process indicator 318 may communicate and share information with client monitor 314, server monitor 310, configuration control 318, and/or recommendation provider 306.

Configuration control 318 may be a client-based module that provides a capability to allocate system resources and to assign value to other variables, such as image quality. Configuration control 318 may be part of client 312, server 302, additional device, or distributed across the network. Configuration control 318 may be implemented with software, hardware, and/or firmware, or any combination thereof. Configuration control 318 may allow a user interacting with a user interface 216 (shown in FIG. 2 as part of client 104) of a client 312 to direct how system resources and other variables should be allocated and assigned. Configuration control 318 may allow a system administrator to direct how to allocate and assign system resources. Configuration control 318 may determine how distributed imaging processes are allocated in a distributed system 300. Configuration control 318 may communicate with various components shown in FIG. 2 on the client 104 and server 102. Configuration control 318 may be in the form of a software module that communicates with operating system 230. Configuration control 318 may be integrated into an image processing application, and may be accessible, for example, through a menu option, such as "Setup," "Options," or "Preferences." The operation of configuration control 318 will be discussed in greater detail below.

Bandwidth of communication pathway 305 may factor in determining how system resources are allocated in order to display medical images on client 312. Bandwidth may be estimated or measured by either of client 312 or server 302. For example, client monitor 314 or server monitor 304 may estimate bandwidth by any of a number of known techniques. One technique for estimating bandwidth is to communicate a test packet of known size across communication pathway 305, and measure a time for completion of test packet communication.

FIG. 7 shows a flowchart of a method 700 for distributed imaging display in accordance with an embodiment of the present invention. Three different branches are shown: a first branch 740, a second branch 750, and a third branch 760. Each of the branches 740, 750, and 760 may start with step 702, in which 3D image data is stored on server (such as server 302 shown in FIG. 3). Each of the branches 740, 750, and 760 may end with step 728, in which 2D image data is processed and displayed on a display on a client (similar to client 312 shown in FIG. 3). Dotted line 730 indicates which steps may be performed by a server, and which by a client. All steps above dotted line 730, such as step 702, may be performed by a server. All steps below dotted line 730, such as step 728, may be performed by a client.

After step 702, the first branch 740 continues to step 704, in which 3D image data may be processed by a server to form 2D image data. Processing may include techniques such as MPR, MIP, VR, and/or other image processing techniques that convert 3D data into 2D data. The 2D image data may be further processed to form image data for display at step 706. For example, 2D image data may be further processed by adjusting grayscale, contrast, and/or brightness. At step 708, 2D image data may be sent from a server, and then received by a client at step 710. The 2D data may be processed and displayed by the client at step 728.

The second branch 750 proceeds after step 702 to step 712, in which a server processes 3D image data to form 2D image data. Processing may include techniques such as MPR, MIP, VR, and/or other image processing techniques that convert 3D data into 2D data. Next, the 2D image data may be sent from a server at step 714 and received at a client in step 716. After receipt of 2D image data, the client may further process the 2D image data to form image data for display. At step 728, the client may process and display 2D image data on a display.

The third branch 760 proceeds after step 702 to step 720, in which 3D image data may be sent from a server and received at a client in step 722. A client may process 3D image data to form 2D image data at step 724. Processing may include techniques such as MPR, MIP, VR, and/or other image processing techniques that convert 3D data into 2D data. Next a client may further process the 2D image data to form image data for display. At step 728, the client may process and display 2D image data on a display. As can be seen from the angle of dotted line 730, the amount of processing performed by the client and server differs depending on which branch is followed in flowchart 700. The steps of flowchart 700 may be performed in a differing order. Additionally, one or more steps of flowchart 700 may be omitted. For example, step 718, 726, or 706 may be omitted. The three branches 740, 750, and 760 are not exhaustive of all possible process flows for distributed imaging. Instead, they are merely illustrative of the concept of how process flow may be allocated under different scenarios. Additional variations—such as dividing the processing performed in steps 704, 712, and 724 between both a client and a server—are also possible.

Figure 4:
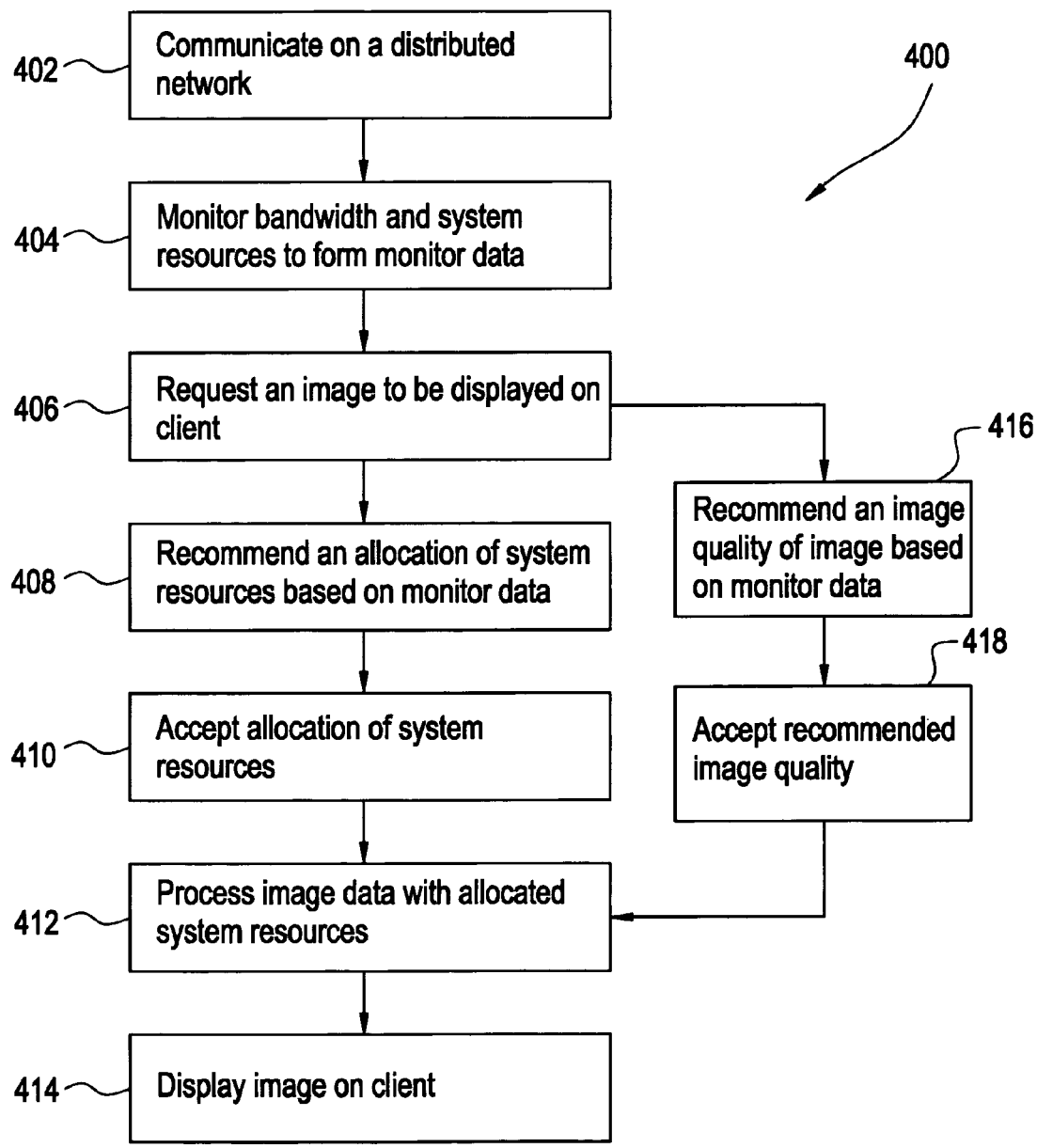
FIG. 4 shows a flowchart for a method for recommending an allocation of system resources for distributed image processing in accordance with an embodiment of the present application.

In order to determine how to allocate distributed processing between a client and server, some type of allocation process may be desired. FIG. 4 shows a flowchart for a method 400 for recommending an allocation of resources for distributed image processing in accordance with an embodiment of the present application. Starting at step 402, there is communication on a distributed network. For example, client 312 may communicate to server 302 that an image is to be displayed on client 312. Communications may include a variety of information including monitor data, image processing allocations, and configuration control directives.

At step 404, a monitor monitors bandwidth and system resources. Step 404 may be performed by one or more monitor. For example, step 404 may be performed by server monitor 310 and client monitor 314 (both shown in FIG. 3). The monitor(s) may provide monitor data that corresponds to the bandwidth and system resources. For example, the monitor(s) may track the following characteristics of distributed network 300: bandwidth of a communication pathway 305; load of server 302 CPU (similar to server 202 shown in FIG. 2); and processing speed of client 312. The monitor(s) may provide monitor data corresponding to various system resources and bandwidth. For example, monitor(s) may provide monitor data corresponding to load of server 302 CPU, processing speed of client 312, processing performance of client 312, and bandwidth of communication pathway 305.

At step 406, there is a request to display an image on client. For example, client 312 may be running image processing software. A user may interact with the software to perform an image processing task on a medical image. The software may initiate an image processing request that is relayed to the operating system of the client 312. This image processing request may include information about the image to be processed, such as image quality. The image processing request may also include information about the nature of the image processing request, such as to zoom or pan the image, for example. The image processing request may be communicated from the client 312 to the server 302.

At step 408, an allocation of system resources are recommended based on monitor data. Turning for a moment to FIG. 5, a table 500 is shown with several examples of allocation in accordance with an embodiment of the present application. The examples are illustrative and not exhaustive. In example 1, the server 302 is relatively unloaded, meaning that the server CPU is not overly burdened by other pending tasks. Furthermore, the client 312 processing speed is relatively slow, and the bandwidth of the communications pathway is relatively high. It should be understood that a bandwidth that is relatively high indicates that three dimensional image data stored on a server 302 may be communicated to a client 312 without substantial delay. A delay may be substantial, for example, if an alternate image processing flow would have resulted in faster image display on client 312. In other words, substantial delay may result when inefficient image processing flow is selected. In the scenario of example 1, all processing tasks are recommended to be performed primarily on the server 302. The recommendation in example 1 may correspond to, anticipate, or trigger a process flow similar to that depicted in the first branch 740 of FIG. 7.

In example 2, the server 302 is relatively unloaded, meaning that the server CPU is not overly burdened by other pending tasks. Furthermore, the client 312 processing speed is relatively slow, and the bandwidth of the communications pathway is relatively low. In this scenario some simple processing tasks, like pan & zoom may be performed by client 312, while advanced tasks may be reserved for server 302. In this scenario all processing tasks are recommended to be performed primarily on the server 302. The recommendation in example 2 may correspond to, anticipate, or trigger a process flow similar to that depicted in the second branch 750 of FIG. 7.

In example 3, the server 302 is relatively loaded, meaning that the server CPU has pending tasks that may interfere with the server's ability to perform image processing. Furthermore, the client processing speed is relatively fast, and the bandwidth of the communications pathway is relatively high. In this scenario all processing tasks are recommended to be performed on the client 312. The recommendation in example 3 may correspond to, anticipate, or trigger a process flow similar to that depicted in the third branch 760 of FIG. 7.

Turning back now to FIG. 4, at optional step 416, an image quality is also recommended based on monitor data. For example, if client processing speed is relatively slow, a lower image quality may be recommended to improve image processing speed.

At step 410 the recommended allocation of system resources may be accepted. The allocation may be accepted, for example, by the server 302 and/or the client 312. The allocation may be automatically accepted, or may be manually accepted. Additionally, the allocation may be conditionally accepted, based on a set of rules. A configuration control 318 may provide rules for conditional acceptance of recommendations.

At optional step 418, the recommended image quality is accepted. Again, the recommendation may be automatically accepted, manually accepted, or conditionally accepted.

At step 412, image data is processed with the allocated system resources. For example, some client resources 316 and some server resources 308 may have been allocated in step 408 for efficient image processing. The allocated server resources 308 may then perform a portion of the image processing, while the allocated client resources 316 perform the remainder of the image processing. Image processing may include processing-intensive techniques such as MPR, MIP, VR, and/or additional 3D-to-2D processing techniques. Image processing may also include techniques such as rotate, pan, zoom, contrast adjustment, brightness adjustment, and/or grayscale adjustment, and the like.

At step 414, a corresponding image is displayed on client 312. After the image has been processed by the allocated system resources in step 412, the resulting image may be displayed on the client 312. The processing to display an image on client 312 may also be considered as part of image processing, more generally.

The steps of method 400 may be performed in any order. Additionally, one or more steps of method 400 may be omitted. For example, step 404 may be performed after step 406, and steps 410, 412, and 414 may be omitted.

As an illustrative example, embodiments of the present application may be used in the following manner. On a distributed network 300, a client 312 displays a medical image on display 214. Image data may be stored locally, at client 312, or at server 302. The client 312 provides an application that allows a user to edit or alter the displayed image. A user interacts with client 312 through user interface 216. The user can choose from a variety of image processing tasks to edit or alter the displayed image with the image processing application including: annotation; contrast adjustment; brightness adjustment; grayscale adjustment; pan; zoom; rotation; 3D processing. In this illustrative example, user chooses "contrast adjustment," by directing user interface 216 accordingly. Meanwhile, both client monitor 314 and server monitor 310 have been tracking system resources and bandwidth. Server monitor 310 has been tracking server CPU 202 load, and the most recent indication is that server CPU is relatively unloaded—e.g. the server CPU 202 is over 95% idle. Client monitor 314 determined at startup that client 312 has a relatively slow processor and clock speed. Client monitor 314 has also been tracking bandwidth of communication pathway 305, and the most recent indication is that bandwidth is relatively low. The server monitor 310 provides server CPU loading information as monitor data to recommendation provider 306. The client monitor 314 provides client processing speed and bandwidth information as monitor data to recommendation provider 306. Recommendation provider 306 determines that an efficient image processing mode is to only allocate client resources 316 to adjust the contrast of the image. The recommendation provider 306 also determines that the client 312 can perform this image processing task with sufficient speed only on a low quality image. The recommendation provider 306 provides the recommendations that client resources 316 should be allocated for this task, and that the image should be of low quality. Client 312 automatically accepts the recommendations, and proceeds to process the image by adjusting the contrast per the user's directive.

Continuing the illustrative example, the user next seeks to perform a relatively complicated image processing task. The user seeks to view a different angle of the image. This type of image processing involves the relatively intensive MPR technique. Additionally, the user seeks to retain the contrast adjustment previously applied when viewing a new angle of the image. Both client monitor 314 and server monitor 310 observe no significant changes with system resources and bandwidth. The server monitor 310 provides server CPU loading information as monitor data to recommendation provider 306. The client monitor 314 provides client processing speed and bandwidth information as monitor data to recommendation provider 306. In this case, recommendation provider 306 determines that an efficient image processing mode is to allocate a portion of server resources 308 and a portion client resources 316 to process the image. Server resources 308 can most efficiently perform MPR processing, while client resources 316 can most efficiently perform subsequent contrast adjustment processing. The recommendation provider 306 also determines that system resources can perform processing task with sufficient speed only on a low quality image. The recommendation provider 306 provides recommendations that certain server resources 308 and certain client resources 316 should be allocated for this task, and that the image should be of low quality. Client 312 and server 302 automatically accept the recommendations, and proceed to process the image per the user's directive.

FIG. 6 shows a flowchart for a method 600 of providing configuration control interaction for allocating system resources in a distributed image processing system in accordance with an embodiment of the present application. At step 602, user provides a directive to configuration control 318 regarding allocation of system resources and/or image quality. As another option, a directive may be provided by a system administrator. Also, a directive may be automatically provided, for example, through an automated timer or calendar schedule.

At step 604, there is communication on a distributed network. For example, client 312 may communicate to server 302 that an image is to be displayed on client 312. Communications may include a variety of information including monitor data, image processing allocations, and configuration control directives.

At step 606, bandwidth and system resources are monitored to form monitor data. Step 606 may be performed by one or more monitor. For example, step 606 may be performed by server monitor 310 and client monitor 314 (both shown in FIG. 3). The monitor(s) may provide monitor data that corresponds to the bandwidth and system resources. For example, the monitor(s) may track the following characteristics of distributed network 300: bandwidth of a communication pathway 305; load of server 302 CPU (similar to 202 shown in FIG. 2); and processing speed of client 312. The monitor(s) may provide monitor data corresponding to various system resources and bandwidth. For example, monitor (s) may provide monitor data corresponding to load of server 302 CPU, processing speed of client 312, processing performance of client 312, and bandwidth of communication pathway 305.

At step 608, there is a request to display an image on client. For example, client 312 may be running image processing software. A user may interact with the software to perform an image processing task on a medical image. The software may initiate an image processing request that is relayed to the operating system of the client 312. An image processing request may include information about the image to be processed, such as image quality. The image processing request may also include information about the nature of the image processing request, such as to zoom or pan the image, for example. The image processing request may be communicated from the client 312 to the server 302.

At step 610, an allocation of system resources are recommended based on monitor data and/or configuration control 310. Based on system design and configuration control 310 options, a variety of options may be possible. For example, a recommended allocation may be based exclusively on configuration control 310, or exclusively on monitor data. A recommended allocation may be based on a mix of monitor data and configuration control 310. For example, configuration control 310 may provide a minimum or maximum limit for particular resource allocation. Configuration control 310 may indicate that server CPU 202 loading shall not exceed 50%. Therefore, in this example, any recommended allocation of server CPU 202 should be based on monitor data if server CPU 202 loading remains below 50%, but should cap server CPU 202 loading at 50% as determined by configuration control 310. Various settings or parameters of configuration control 310 may indicate how monitor data and configuration control 310 should influence a recommended allocation.

At optional step 618, an image quality is recommended based on monitor data and/or configuration control 310. Based on system design and configuration control 310 options, a variety of options may be possible. For example, a recommended image quality may be based exclusively on configuration control 310, or exclusively on monitor data. A recommended image quality may be based on a mix of monitor data and configuration control 310. For example, configuration control 310 may provide a minimum or maximum limit for an image quality. Configuration control 310 may indicate that image quality not be less than a certain resolution. Therefore, in this example, any recommended image quality should be based on monitor data if the recommendation is greater than the minimum image quality resolution, but should however cap the recommended image quality resolution as determined by configuration control 310. Various settings of configuration control 310 may indicate how monitor data and configuration control 310 should influence a recommended image quality.

At step 612 the recommended allocation of system resources may be accepted. The allocation may be accepted, for example, by the server 302 and/or the client 312. The allocation may be automatically accepted, or may be manually accepted. Additionally, the allocation may be conditionally accepted, based on a set of rules. A configuration control 318 may provide rules for conditional acceptance of recommendations.

At optional step 620, the recommended image quality is accepted. Again, the recommendation may be automatically accepted or manually accepted.

At step 614, image data is processed with the allocated system resources. For example, some client resources 316 and some server resources 308 may have been allocated in step 610 for efficient image processing. The allocated server resources 308 may then perform a portion of the image processing, while the allocated client resources 316 perform the remainder of the image processing. Image processing may include processing-intensive techniques such as MPR, MIP, VR, and/or additional 3D-to-2D processing techniques. Image processing may also include techniques such as pan, zoom, contrast adjustment, brightness adjustment, and/or grayscale adjustment, and the like.

At step 616, a corresponding image is displayed on client 104. After the image has been processed in step by the allocated system resources in step 614, the resulting image may be displayed on the client 312. The processing to display an image on client 312 may also be considered as part of image processing, more generally.

The steps of method 600 may be performed in any order. Additionally, one or more steps of method 600 may be omitted. For example, step 604 may be performed after step 606, and steps 612, 614, and 616 may be omitted.

As an illustrative example of configuration control 310 interaction, a user interacts with client 104 through user interface 216. User operates image processing software that has an "Options" menu. User opens "Options" menu to access some of configuration control 310 settings. Note, that some configuration control 310 settings may be user accessible, and some may not. In this illustrative example, configuration control 310 settings may include a minimum resolution setting, and a check box that represents whether the minimum setting is an absolute minimum setting, or just a suggested minimum setting. User selects a minimum resolution of 200 dots-per-inch ("DPI"), and selects the check box so that it indicates this is a suggested, and not an absolute minimum setting. User then directs the software to perform image processing. The recommendation provider 314 reviews monitor data gathered by server monitor 304 and client monitor 314. Recommendation provider 314 also reviews settings of configuration control 310. Recommendation provider 314 balances various factors, and determines an efficient way to process the image is for the image to have a resolution of 150 DPI. Recommendation provider 314 recommends an allocation of resources, and a resolution of 150 DPI. The recommendations are accepted by client 312 and server 302. The image data is processed and the image is displayed on the display 214 of the client 312 with a resolution of 150 DPI.

Continuing with the illustrative example, user views the 150 DPI image and decides that the resolution should be higher. So the user opens "Options" menu to access configuration controls 310. User sets the minimum resolution to 175 DPI. User selects the check box indicating that the 175 DPI setting is an absolute setting. User then directs the software to perform image processing. The recommendation provider 314 reviews monitor data gathered by server monitor 304 and client monitor 314. Recommendation provider 314 also reviews settings of configuration control 310. Recommendation provider 314 balances various influencing factors, and determines the most efficient way to process the image having a 175 DPI resolution. Recommendation provider 314 recommends an allocation of resources, and a resolution of 175 DPI. The recommendations are accepted by client 312 and server 102. The image data is processed and the image is displayed on the display 214 of the client 104 with a resolution of 175 DPI. The user reviews the image and is satisfied with the image quality.

FIG. 8 shows a flowchart of a method 800 illustrating iterative user interaction with an examination displayed on a client according to an embodiment of the present invention. At step 802 a user at a client (similar to client 312 shown in FIG. 3) invokes an application that may be capable of displaying images that correspond to an examination. An examination may be one or more sets of volumetric or two dimensional image data that correspond to a radiological examination of a patient. For example, an examination may include 3D cine image data, 2D cine image data, 3D static data, 2D static data, and/or the like. The application may be able to display the entire examination, or a portion of the examination. The application may allow the user to interact through a user interface with a displayed portion of the examination, or the entire examination. For example, the application may allow the user to perform the following interactions: page the image up and/or down; pan the image; zoom in and/or out of the image; rotate the image; adjust contrast; adjust brightness, adjust color parameters; adjust grayscale parameters; adjust a slice thickness; change between maximum intensity projection, average intensity projection, and minimum intensity projection; change to volume rendering mode; adjust an angle of viewing. When a user invokes an application for interacting with an examination, it may be desirable to start a corresponding server-based application that can perform and/or assist with image processing. So, for example, the invocation of the client-based application may cause a message to be sent to a server. The message may instruct or request the server to start up an image processing application, if such an application is not already running on the server. For example, the server-based application may be capable of performing 3D processing, such as MIP, MPR, VR and/or the like.

At step 804, the user selects an examination for viewing. For example, a user may be a radiologist, and may select an examination for clinical purposes. The examination may be selected from a list of examinations, and may correspond to a historical examination, or a recently acquired examination.

At step 806, an allocation of processing is chosen based on monitored system data, configuration control settings, image processing request, and/or user directive. For example, an allocation may be chosen according to method 400, shown in FIG. 4, and/or the method 600 shown in FIG. 6.

At step 808, one or more medical images corresponding to the examination are processed according to the chosen allocation of processing. Images may be processed, for example, in accordance with method 700, shown in FIG. 7. For example, multiple images may be processed that correspond to an examination. Each image may correspond to a different view, such as an axial, sagittal, coronal, and oblique view, for example.

At step 810, one or more medical images are displayed by the client. The image may be displayed on a display, such as a flat-panel monitor or a cathode ray tube. The displayed image may be substantially 2D, but may appear to the user to be 3D. Multiple images may be simultaneously displayed, or may be readily accessible. For example, multiple images corresponding to multiple views of an examination may be simultaneously viewed. As another example, each image display may be stored in memory locally at the client, and a user may rapidly switch between the multiple views without incurring delays associated with reprocessing image data.

At step 812, the user interacts with the displayed image(s) to obtain a different view of the selected examination. For example, the user may interact with the application and/or image to perform the following interactions: page the image up and/or down; pan the image; zoom in and/or out of the image; rotate the image; adjust contrast; adjust brightness, adjust color parameters; adjust grayscale parameters; adjust a slice thickness; change between maximum intensity projection, average intensity projection, and minimum intensity projection; change to volume rendering mode; adjust an angle of viewing. The user may interact with a mouse, keyboard, or other user interface devices. For example, a user may interact with a touch screen touch pad, joystick, and/or the like. The user may interact with the application program, through menus, control panels, graphical user interface (GUI) elements, and/or the like. The user may also interact with a displayed image through the operating system by, for example, adjusting display properties. User interaction with a displayed image may result in an image processing request.

When a user interacts with a displayed image, a different image may need to be displayed on the client to reflect the user interaction. For example, if a user chooses to zoom in on an image, the zoomed (enlarged) portion of the image may be displayed to reflect the user's interaction. To accomplish this interaction, the flow in method 800 may flow back to one or more previous steps. For example, to accomplish an interaction, method 800 may flow back to step 806. At step 806 a new allocation may be chosen. It may be possible for the system resource monitor to determine that system resources have substantially changed and recommend a new resource allocation. For example, an initial allocation may correspond to branch 750 in FIG. 7. This allocation may have been chosen because the bandwidth of communications pathway was relatively low, as shown in example 2 of FIG. 5. During a subsequent interaction, however, network conditions may have improved, leading to a relatively high bandwidth of the communications pathway. Therefore, according to example 1 of FIG. 5, a more efficient allocation may correspond to branch 740 of FIG. 7. In other words, it may be more efficient to have the server do more image processing tasks because of the improved network conditions.

It may not, however, be desirable to reallocate system resources during every interaction. Accordingly, interactive flow may be routed from step 812 to step 808. At step 808, images are processed according to a prior allocation of processing. For example, if an image processing task has been allocated to the server, then image processing requests may go directly to the server. As another example, if an image processing task has been allocated to the client, then an image processing request may be handled locally at a client.

Process flow may flow back to different steps based on the nature of an image processing request. For example, if an image processing request may involve intensive use of processing resources, then it may be desirable to determine again resource allocation. As another example, if an image processing request may not involve intensive use of resources, then it may be desirable to stick with the existing allocation of resources.

The steps of method 800 may be performed in a different order. Additionally, one or more steps of method 600 may be omitted. For example, steps 802 or 804 may be omitted. As another example, step 806 may be performed before steps 802 or 804.

The following illustrative example describes how user interaction with an image may be achieved according to method 800. At step 802, a user on a client opens up a software application designed to view radiological examinations. The software application also allows the user to interact with the images of the examination. The user then, at step 804, selects an examination to view. The examination in this example is from an ultrasound of a fetus. Next, at step 806, an allocation of processing is selected. In this case, monitor data indicates that the server is unloaded, the bandwidth is high, and the client is slow. In accordance with example 1 of FIG. 5, most of the image processing is allocated to be performed on the server, as shown, for example, in branch 740 of FIG. 7. Next, at step 808, the image data, initially stored on the server, is processed by the server, and transmitted to the client. The processed image data is a 2D image of the fetus that appears 3D. The 2D image is displayed on the client at step 810. Next, at step 812, the user views the image of the fetus. The user, however, wishes to view a different angle of the fetus. Accordingly, the user opens a control panel in the software application, and enters a new viewing angle. The software interprets the interaction, and generates an image processing request. The image with the new view angle will require that the image data be reprocessed with MPR techniques. The software application recognizes that this type of interaction may require substantial processing resources. Consequently, the process flow is routed back to step 806. At step 806, it is determined that the network conditions have worsened, and the bandwidth is now relatively low. Therefore, in accordance with example 2 of FIG. 5, most of the 3D image processing is allocated to be performed on the server, while simpler tasks are allocated to be performed by the client. This type of allocation is shown, for example, in branch 750 of FIG. 7. At step 808, the image data is then processed in accordance with the image processing request. The images are then displayed on the client in step 810.

Next, the user decides to alter the contrast of the new angle view at step 812. Accordingly, the user opens a control panel in the software application, and enters a new contrast amount. The software interprets the interaction, and generates an image processing request. The software application also recognizes that this type of interaction may not require substantial processing resources. Consequently, the process flow is routed back to step 808. The image data is processed in accordance with the image processing request and the prior allocation. Because the prior allocation of resources allocated the client to perform this type of image processing, the image processing request is routed directly to the client, locally. The images are then displayed on the client in step 810. The iterative process continues, as the user continues to interact with the image at step 812.

Thus, embodiments of the present application provide methods and systems that efficiently process image data on a distributed network. Additionally, embodiments of the present application provide methods and systems that efficiently allocate image processing tasks throughout a distributed network. Moreover, embodiments of the present application provide flexibility and control to a user of a distributed imaging system.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. For example, features may be implemented with software, hardware, or a mix thereof. Therefore, it is intended that the invention not be limited to the particular embodiment disclosed, but that the invention will include all embodiments falling within the scope of the appended claims.

The invention claimed is:

1. A method of medical image processing on a distributed network comprising:

communicating on a distributed network comprising a server, a client, and a communications pathway having a bandwidth, wherein said distributed network comprises system resources related to said server, said client, and said communications pathway;

monitoring said system resources and said bandwidth with at least one process monitor to generate monitor data; and recommending an allocation of at least a portion of said system resources for processing three dimensional image data to form two dimensional image data displayable on said client, wherein said allocation is based at least in part on said monitor data.

2. The method of claim 1, wherein said processing three dimensional image data to form two dimensional image data comprises at least one of: multi-planar reformatting; minimum intensity projection, maximum intensity projection, and volume rendering.

3. The method of claim 1, wherein said processing three dimensional image data to form two dimensional image data comprises at least one of: rotate, zoom, pan, contrast adjustment, brightness adjustment, and grayscale adjustment.

4. The method of claim 3, wherein said processing three dimensional image data to form two dimensional image data is performable substantially in real-time in response to an interaction at said client.

5. The method of claim 1, wherein said at least one process monitor comprises a client-side monitor and a server-side monitor.

6. The method of claim 1, wherein said system resources comprises a processing load of said server, and a processing speed of said client.

7. The method of claim 1 further comprising recommending an image quality of said image based at least in part on said monitor data.

8. A system for medical image processing comprising:
- a server comprising server processing resources and capable of storing three dimensional image data;
- a client capable of communications with said server though a communication pathway having a bandwidth, said client comprising client processing resources, and said client capable of displaying a two dimensional image formed from said three dimensional image data; and
- a configuration control capable of allocating at least a portion of said server processing resources and at least a portion of said client processing resources for displaying said image on said client based at least in part on said client processing resources, said server processing resources, and said bandwidth.

9. The system of claim 8, wherein said configuration control is capable of interacting with a recommendation provider for providing recommendations for an apportionment of image processing amongst said client and said server based at least in part on said client processing resources, said server processing resources, and said bandwidth.

10. The system of claim 8, wherein said two dimensional image is formable from said three dimensional image data with at least one of: multi-planar reformatting; minimum intensity projection, maximum intensity projection, and volume rendering.

11. The system of claim 8, wherein said configuration control is adjustable by a user.

12. The system of claim 8, wherein said configuration control is further capable of controlling an image quality of said image.

13. The system of claim 8, wherein said configuration control is capable of receiving information corresponding to said bandwidth, said server processing resources, and said client processing resources.

14. The system of claim 8, wherein said configuration control is capable overriding said recommendations of said recommendation provider.

15. The system of claim 8, wherein said configuration control is capable of causing an overriding of a prior designation of said image quality.

16. A computer-readable storage medium including a set of instructions for a computer, the set of instructions comprising:
- a monitoring routine for monitoring system resources of a distributed network comprising a client and a server, and a bandwidth of a communications channel linking said client and said server, wherein said monitoring routine generates monitor data;
- a requesting routine for requesting display of a two dimensional image at said client, said two dimensional image formable by processing three dimensional image data storable on said server; and
- a recommending routine for recommending an image quality of said two dimensional image, and an allocation of said system resources on said distributed network to display said two dimensional image at said client based at least on said monitor data.

17. The computer-readable storage medium of claim 16, wherein said allocation of said system resources comprises at least one of: an allocation of said system resources corresponding to said server for three dimensional image processing and two dimensional image processing; an allocation of said system resources corresponding to said client for three dimensional image processing and two dimensional image processing; and an allocation of said system resources corresponding to said server for three dimensional image processing and said system resources corresponding to said client for two dimensional image processing.

18. The computer-readable storage medium of claim 17, wherein said recommendation routine recommends an allocation of allocation of said system resources corresponding to said server for three dimensional image processing and two dimensional image processing based at least in part on said monitor data indicating said server is substantially unloaded.

19. The computer-readable storage medium of claim 17, wherein said recommendation routine recommends an allocation of said system resources corresponding to said client for three dimensional image processing and two dimensional image processing based at least in part on said monitor data indicating said server is substantially loaded and said bandwidth of said communications channel is capable of communicating said three dimensional image data from said server to said client without substantial delay.

* * * * *